United States Patent [19]
Benson

[11] 3,859,796
[45] Jan. 14, 1975

[54] SUBMERSIBLE OIL BOOM
[75] Inventor: Robert A. Benson, Cohasset, Mass.
[73] Assignee: Submarine Engineering Associates, Inc., Cohasset, Mass.
[22] Filed: Mar. 27, 1974
[21] Appl. No.: 455,198

Related U.S. Application Data
[63] Continuation-in-part of Ser. No. 222,867, Feb. 2, 1972, Pat. No. 3,818,708.

[52] U.S. Cl. .................................................. 61/1 F
[51] Int. Cl. ............................................ E02b 15/04
[58] Field of Search ......... 61/1 F; 210/242, DIG. 21

[56] References Cited
UNITED STATES PATENTS

| | | | |
|---|---|---|---|
| 3,685,296 | 8/1972 | Bogosian | 61/1 F |
| 3,708,983 | 1/1973 | Brown | 61/1 F |
| 3,779,020 | 12/1973 | Muramatsu | 61/1 F |
| 3,802,201 | 4/1974 | Hoult | 61/1 F |

Primary Examiner—Peter M. Caun

[57] ABSTRACT

A submersible oil barrier or boom capable of enclosing an area of water surface, said barrier being made up of sections each comprising a solid vertical dam and substantially continuous flotation elements extending laterally from opposite sides of the dam, the barrier being submersible, that is, selectively floatatable and sinkable so that the barrier may be sunk for passage of an oil tanker or the like thereover and subsequently again floated to enclose an area including such tanker for confining oil spills.

16 Claims, 14 Drawing Figures

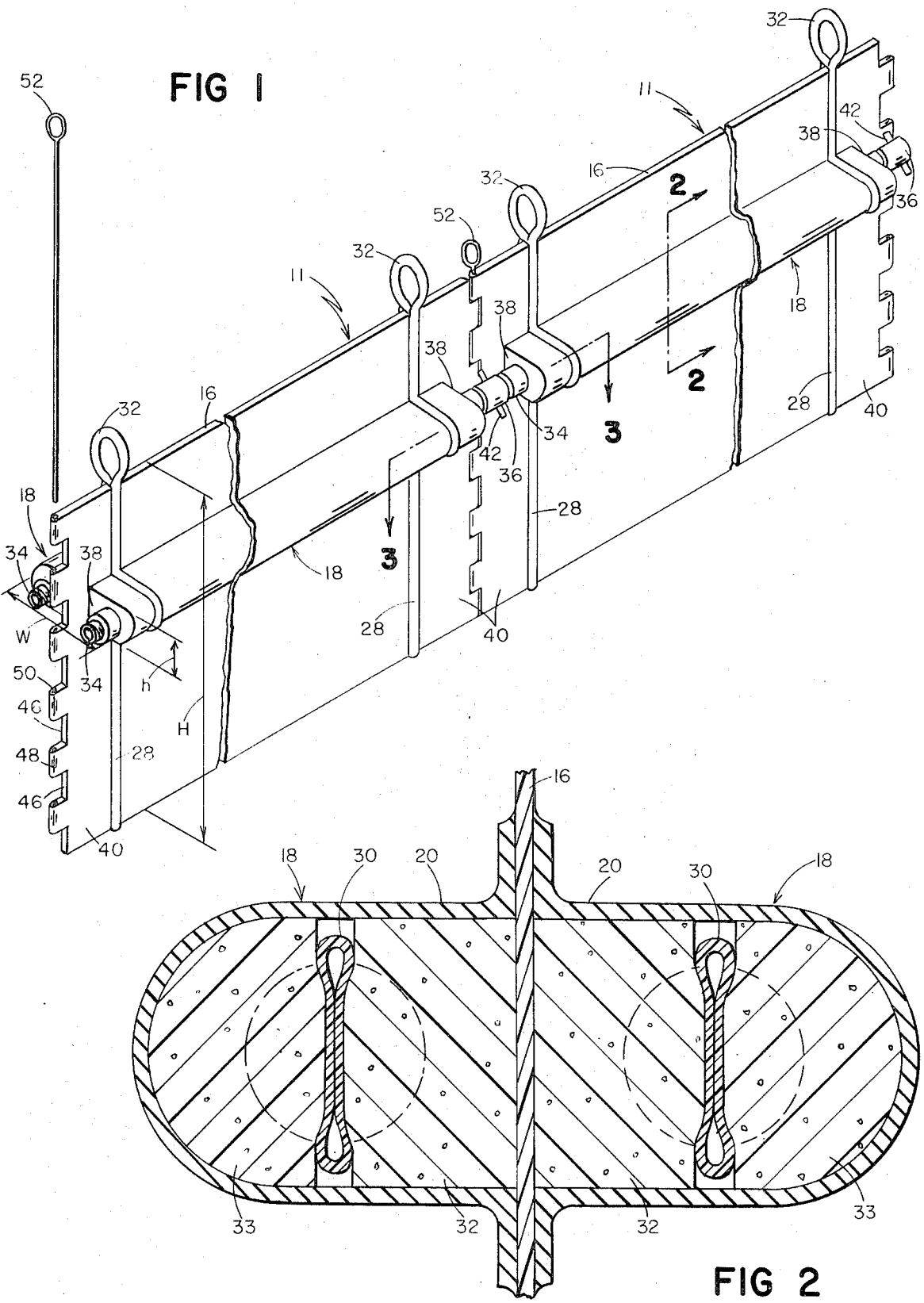

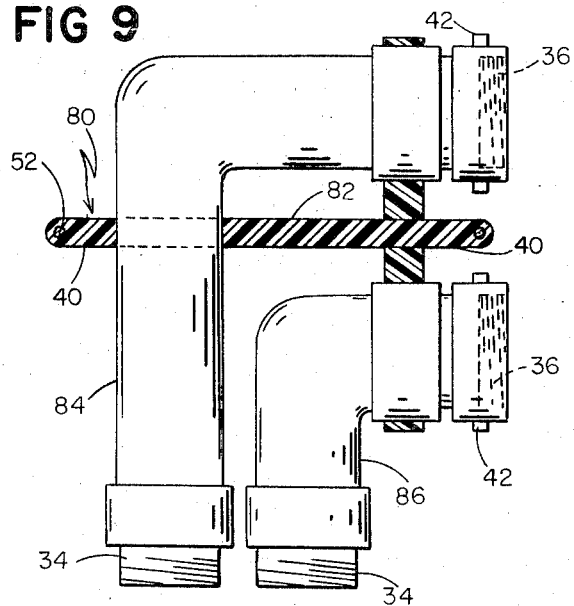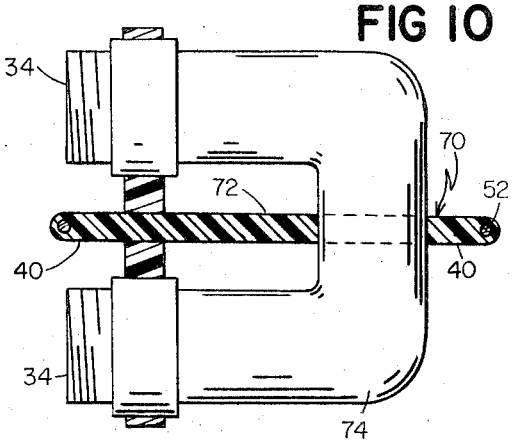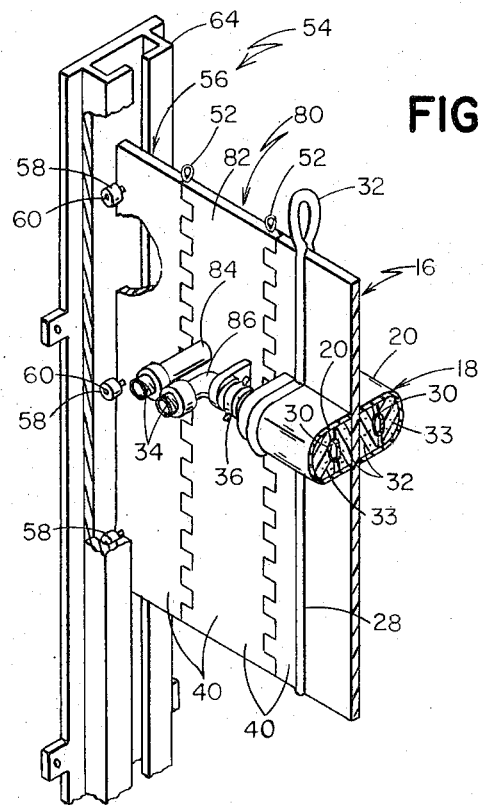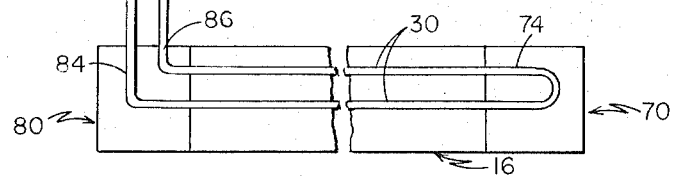

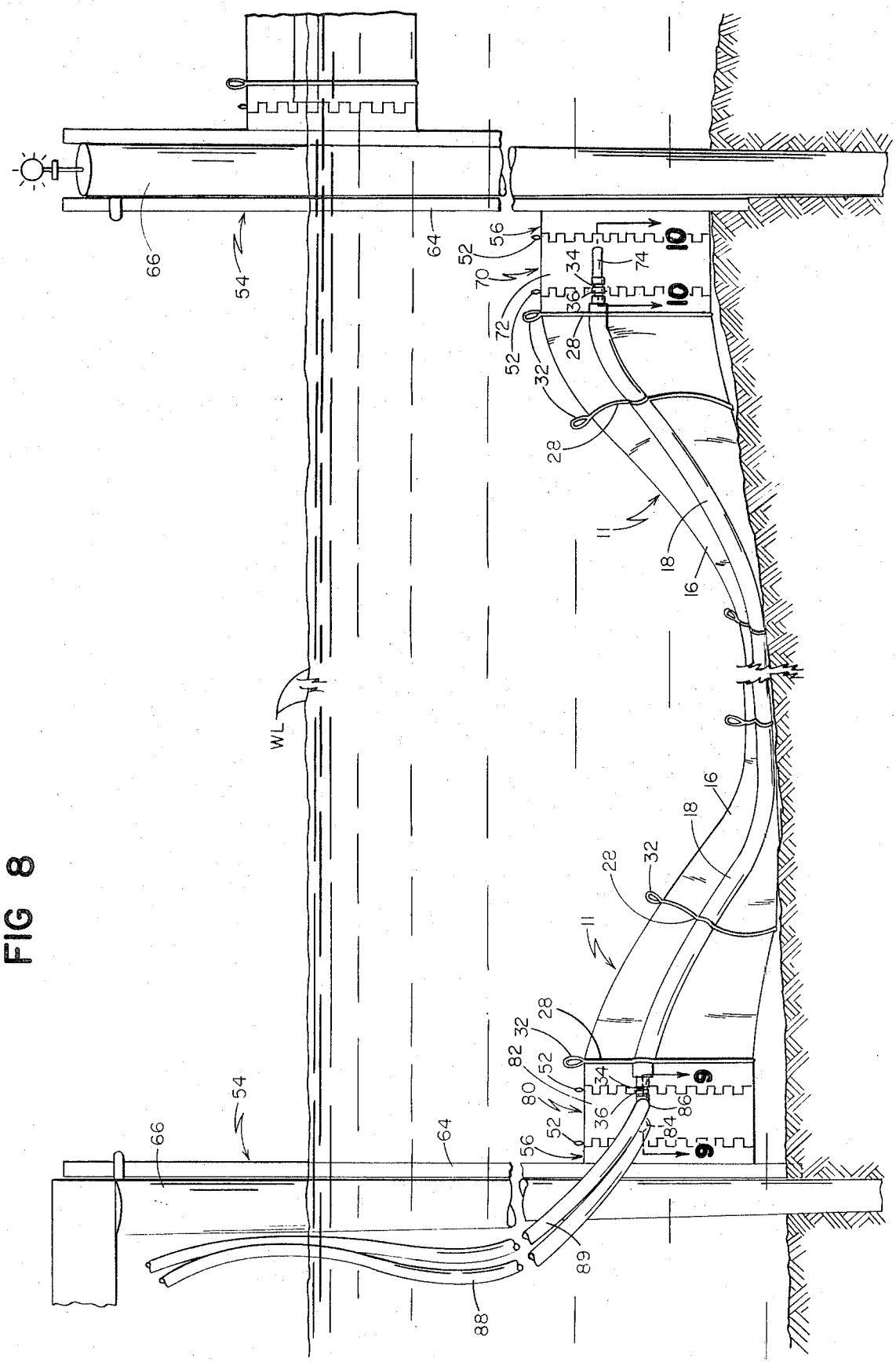

SUBMERSIBLE OIL BOOM

CROSS-REFERENCE TO RELATED APPLICATIONS

This application is a continuation-in-part of application Ser. No. 222,867, filed Feb. 2, 1972, now U.S. Pat. No. 3,818,708, issued June 25, 1974.

BACKGROUND OF THE INVENTION

1. Field of the Invention

This invention relates to floating barriers capable of enclosing an area of water surface, e.g. to contain an actual or potential oil spill, and more particularly to such a barrier which is submersible, that is, capable of being selectively sunk and floated to permit passage of a vessel thereover.

2. Description of the Prior Art

Many floating oil barrier devices have been developed in the past. Generally, they are light-weight, deployable booms designed not only for clean-up purposes after an oil spill occurs, but also for deployment, more or less permanently, under piers and around a tanker after the vessel has tied-up. These booms are generally composed of light bag-like flotation, foam cylinders, or foam blocks which support thin sheet dams or curtains composed of various materials such as thin rubber, vinyl, coated fabrics, asbestos, wood or similar materials, joined with a variety of bolting, pinning, or snap systems. Some are inflatable, and may be deflated so that they will sink for passage of a tanker over them, after which they are again inflated to reestablish the integrity of the floating barrier around the tanker.

Such barriers, to be practical, must meet stringent operating conditions. The barrier should be made entirely of rubberlike material, and free from metal chains or cables extending therealong, so that when it is accidentally run over by a ship, rather than winding up around a propellor or shaft and so possibly causing considerable damage or delay necessary for its removal, it is simply chopped up into pieces. In such case, it is desirable that its sections be relatively short and easily replaceable, thus causing no particular problems, certainly fewer than those of a ship immobilized until its propellor can be freed of chain or cable wrappings. The barrier of said Patent has proved to be highly effective under actual operating conditions in permanent installations.

However, it is also desirable that at least portions of a barrier of the type permanently employed in connection with a tanker loading or unloading operation be submersible, that is, capable of being selectively sunk for passage of a ship over it, and thereafter raised to reestablish the barrier around the ship. Furthermore, it is desirable that such a submersible barrier normally float, so that such barrier or pieces thereof will remain on the surface or, if desired automatically come to the surface if lost or damaged. This is not the case with such barriers of the air- inflatable type since, upon loss of their air due to damage, they sink and so are ineffective for oil containment.

SUMMARY OF THE INVENTION

It is a major object of the present invention to provide a durable, stable, submersible, that is, selectively floatatable and sinkable, oil containment barrier which will remain functional at all times for extended periods of time, and a fail-safe one which will remain surfaced or automatically come to the surface or both, as desired, if damaged.

According to the present invention, there is provided an oil containment barrier or boom made up of a plurality of submersible barrier sections, each comprising a vertical dam, preferably at least ¼ inch thick constructed of elastic, resiliently stretchable, solid, plastic, rubberlike material having Shore A scale durometer hardness between 60 and 90 and resiliently deformable in all directions, preferably with vertical stiffening ribs, and with submersible flotation elements below the top of the dam extending laterally from opposite sides of the dam, said elements preferably being D-shaped in cross-section, providing curved outer edges and of overall width between one-fourth and two-thirds the height of said dam, extending continuously along the length of the section to provide strength and continuity for the dam.

Each submersible flotation element has an outer shell, preferably elastically and resiliently deformable in all directions. Although the shell may be charged with air or water to float or sink it, it is preferred that resiliently expandable and compressible gas-filled flotation means, preferably a closed cell plastic foam material or a sealed, gas-filled collapsible tube or gas-filled compressible spheres or other such elements, be employed to float the barrier section when expanded for fail-safe operation, together with operating means, such as a collapsible hollow operating tube, or simply the remaining volume within the shell itself, for compressing the gas-filled flotation means to sink the barrier section.

In preferred embodiments, there is employed an inner hollow operating tube within the outer shell, with or without a restraining tube, the inner hollow operating tube being selectively filled with air or water, changing the elements when filled with water or other non-compressible fluid from floatatable to sinkable condition to sink the barrier section and when filled with air or other gas to float the barrier section. The operating tube is resiliently deformable with means provided for maintaining the tube in collapsed configuration, which may be a sealed inflated flotation tube, compressible gas-filled spheres or, preferably, resiliently elastic closed cell foam material within the outer shell, maintaining the operating tube in collapsed condition and the barrier section in floatatable condition for fail-safe operation. The outer shell may also contain a restraining tube which is elastically deformable except in a circumferential direction. The inner hollow operating tube is selectively filled with water or other non-compressible fluid or air under pressure to compress the elastic foam material, changing the elements, when filled with water, to sinkable condition to sink the barrier section and, when filled with air, to float the barrier section. The elastic foam material, upon release of fluid pressure in the tube, expands to collapse the operating tube, changing the elements to floatatable condition automatically to float the barrier section.

The entire barrier section is preferably resiliently deformable in all directions and free from cables, lines and chains.

Other advantages and features of the invention will be apparent from the description and drawings herein of preferred embodiments thereof.

BRIEF DESCRIPTION OF THE DRAWINGS

FIG. 1 is an isometric view of the structure of the invention showing two barrier sections connected with the section joiners;

FIGS. 2 and 3 are sectional views through 2—2 and 3—3 of FIG. 1;

FIG. 7 is an isometric view of one end of a barrier section, connected in a fixed channel;

FIG. 8 is a side view of an installation of a complete boom of the invention, shown in submerged condition;

FIGS. 9 and 10 are sections of portions of the boom of FIG. 8, taken on lines 9—9 and 10—10 thereof;

FIG. 11 is a schematic diagram of an operating system for the boom installation of FIG. 8;

DESCRIPTION OF THE PREFERRED EMBODIMENTS

Figure 3:
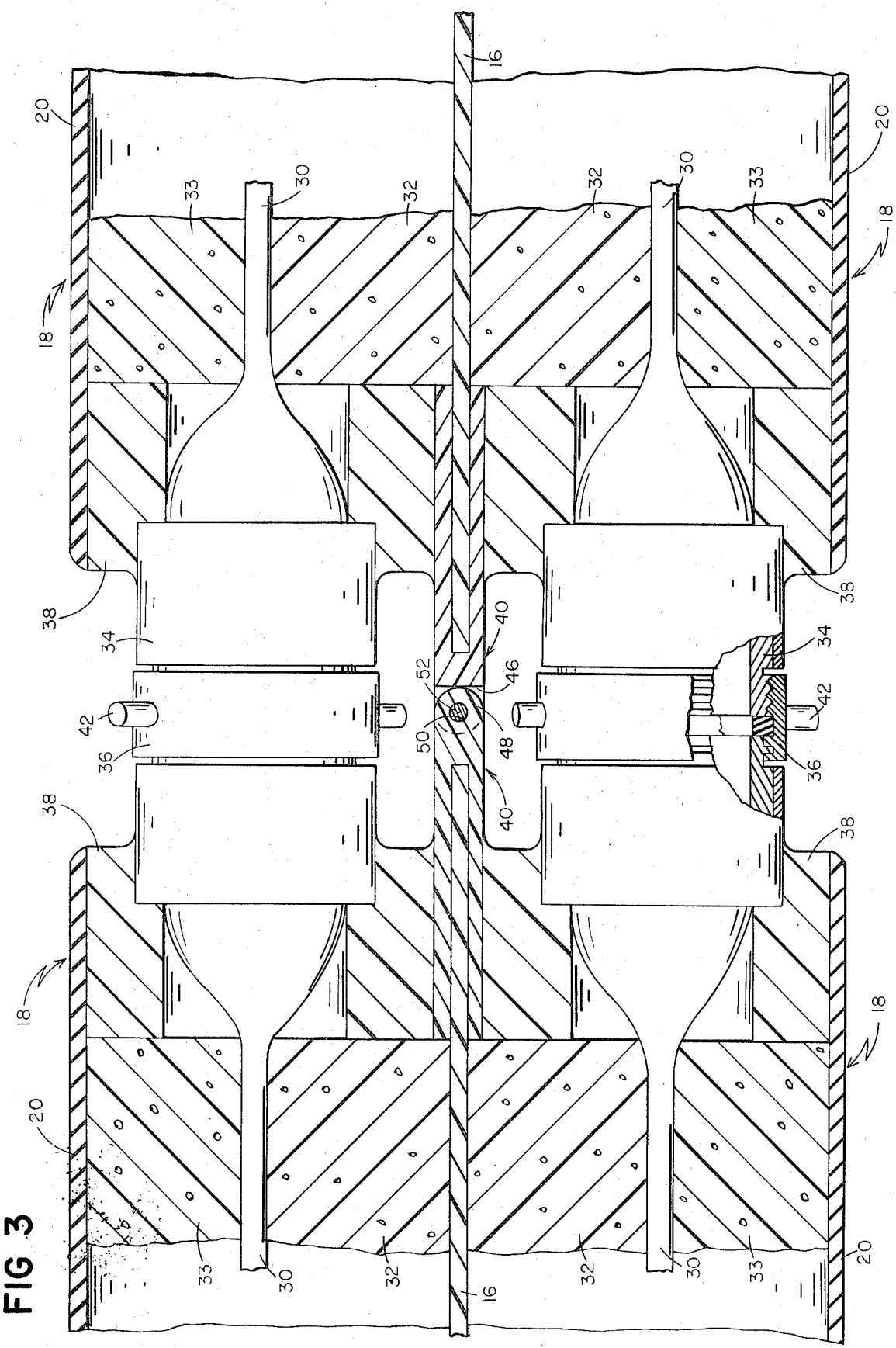

Referring to the drawings, a typical barrier section 11 consists of a vertical dam 16 sandwiched between two D-shaped hollow flotation elements, generally designated 18. The overall width $W$ of elements 18 is one-fourth to two-thirds (preferably one-third) the overall height $H$ of the dam, and is greater than the height $h$ of the elements (preferably $W = 3h$).

The flotation elements 18 are substantially continuous along the total length of the barrier, except between the flotation elements of contiguous sections, thereby providing a uniform configuration and stability along the entire length of the total barrier regardless of the total length of the barrier, which will vary with the use. Vertical plastic ribs 28 of between 90 Shore A scale and 50 Shore D scale durometer hardness are located at about four foot intervals along the barrier section 11. The stiffness of the ribs closely maintains the relative position of the dam 16 and elements 18. The ribs 28 extend from a point at the bottom edge of one side of the dam 16 vertically upward, against the dam 16, around element 18, upward against the dam 16, over the top of the dam 16 in a hand-sized loop 32, downward on the opposite side of the dam 16, around element 18 and on down to the bottom edge of the dam 16 opposite the starting point. The rib 28 is bonded, sealed, or otherwise tightly fastened against the dam in order to provide a semi-rigid stiffener and to serve other purposes which are described subsequently.

The barrier utilizes a boom section joiner, generally designated 40, to provide a flexible, quick joining and releasing method which is compatible with the environmental requirements and the overall characteristic and design of the invention.

The joiner 40 utilizes a piano hinge-like plastic fitting which is attached to the ends of each barrier section 11, or to other components which are to be connected to the basic boom sections. The joiner hinge 40 is folded around the end of the dam 16 and bonded to the dam. Close tolerance openings 46 are cut, cast or molded into the joiner 40 with a vertical separation between hinge projections 48 of generally greater than one inch and a hole 50 through the projections 48 preferably ¼ inch or greater in diameter. There are right and left hand joiners 40 which when joined bring the sections or components closely together in the same plane vertically and horizontally. The snugging of joiners 40 as pin 52 is inserted provides a close fit which prevents oil or other contained materials from leaking or passing through the joined sections of the boom or its components.

A major feature of the submersible barrier section of the present invention resides in the flotation elements 18 extending laterally from opposite sides of dam 16, said elements, as explained above, preferably being D-shaped in cross-section, providing curved outer edges and of overall width between one-fourth and two-thirds the height of said dam, and extending continuously along the length of said section to provide strength and continuity for said dam. In order to provide for the submersible feature, each said element has, in addition to its outer shell 20 resiliently deformable in all directions, as shown in FIG. 2, a resiliently deformable inner hollow operating tube 30 (shown as collapsed in FIG. 2) within said outer shell and resiliently elastic, highly compressible closed-cell foam material comprising a rectangular inner piece 32 and a D-shaped outer piece 33 within said outer shell, maintaining said tube in collapsed condition in the absence of fluid pressure within tube 30 (FIGS. 2 and 6), so that elements 18 automatically maintain barrier section 11 in fail-safe floatable condition under such circumstances.

Figure 12:
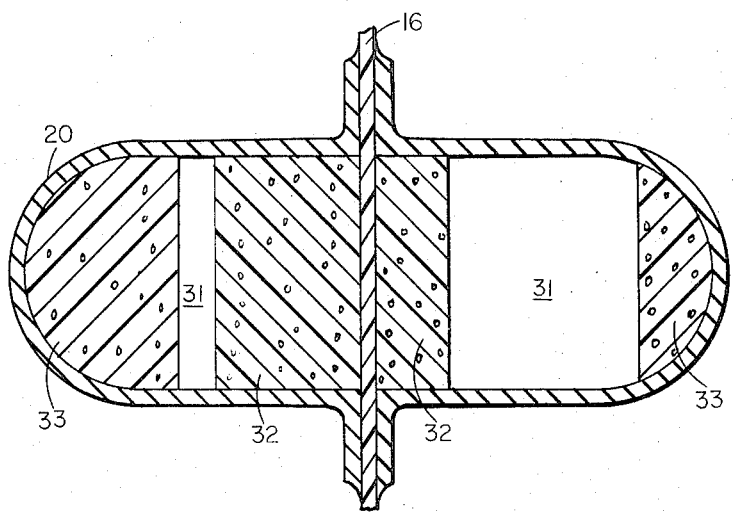
FIG. 12 is a sectional view, similar to that of FIG. 2, showing an alternative construction in which the operating tube is omitted.
Figure 13:
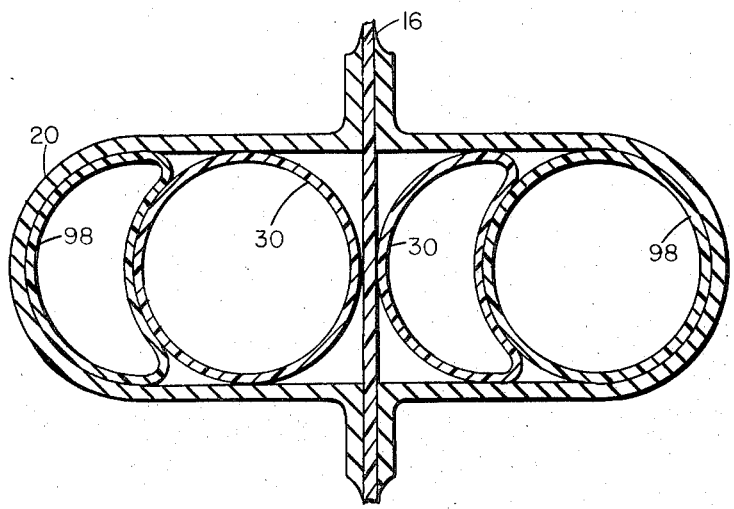
FIG. 13 is a sectional view, similar to that of FIG. 2, showing another alternative construction employing a flotation tube in addition to an operating tube.
Figure 14:
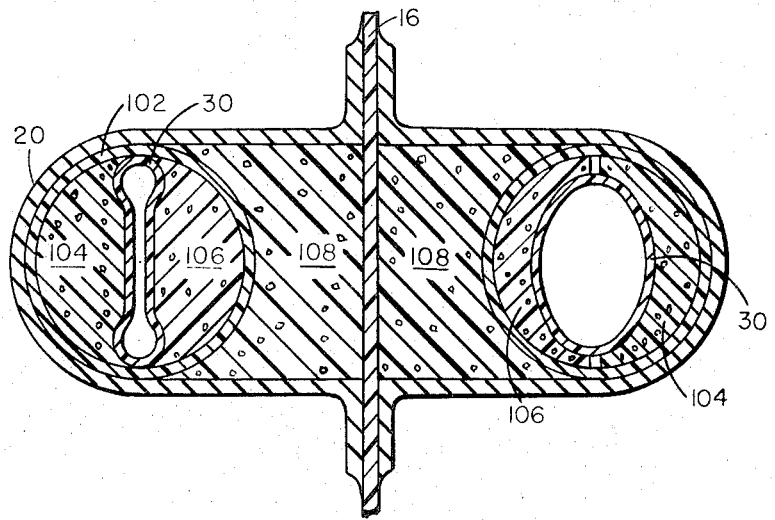
FIG. 14 is a sectional view, similar to that of FIG. 2, showing still another alternative construction utilizing a restraining tube.

Alternative constructions are shown in FIGS. 12, 13 and 14, shown in different operating configurations on different sides. In FIG. 12, the operating tube 30 is omitted, with a space 31 being provided between foam pieces 32 and 33 for introduction of pressurized fluid into outer shell 20 to compress the foam pieces, as shown on the right side. In FIG. 13, foam pieces 32 and 33 are replaced with a sealed collapsible flotation tube 98, extending for the length of a barrier section, shown as alternatively expanded and collapsed by the introduction of pressurized fluid into operating tube 30, or, as in FIG. 12, such tube could also be omitted and the interior of shell 20 directly pressurized. In FIG. 14, a restraining tube 102 contains tube 30 between foam pieces 104 and 106. An additional foam piece 108 is positioned between restraining tube 102 and dam 16.

In normal use, tubes 30 (or in their absence the interior of shells 20) are pressurized either by air to float the barrier section (FIG. 4) or by water to sink it (FIG. 5) by expanding tubes 30 to their full diameter by compressing foam material pieces 32, 33 and slightly expanding outer shell 20. To this end, each of tubes 30 (or shells 20) are provided with end fittings, externally threaded fitting 34 on one end and rotatable, internally threaded fitting 36 on the other end, in each instance mounted within outer shell 20 by end plugs 38. Pins 42 are provided on rotatable fitting 36 for rotation thereof for attachment to a cooperating fitting 34.

An important aspect of the invention is the configuration and physical characteristics of the foam pieces 32, 33 which surround tubes 30 within shell 20. These pieces are shaped closely to conform to the heavy outer material of each shell 20 as well as to tubes 30 or foam pieces 108 and 106 or to the restraining tubes 102. This characteristic of the invention helps to maintain the shape of the flotation elements 18. In addition, the foam pieces 32, 33 104, 106, 108 must be composed of a highly compressible, as well as resilient and elastic, closed cell, flexible plastic foam material which is essentially non-water absorbent, thus preventing absorption of water and consequent loss of buoyancy and stability. The compressibility of such pieces should be at least 4 to 1 and preferably greater so that they will be able to collapse tube 30 and expel water from it or expand to expel the water from the shell as in FIG. 12.

The dam 16 and shells of the tubes 18 are preferably composed of a highly resilient rubberlike material of rubber or polyurethane formulation. The collapsible internal tubes 30 are of polyester reinforced rubber or the like so that they are readily elastically collapsible and expandable, as well as being flexible and resilient. The restraining tubes 102 are flexible and resilient but not expandable, being restrained by relatively non-elastic fibers such as polyester, nylon or glass fibers. The elastically compressible foam material of pieces 32, 33, 104, 106, 108 is composed of a highly elastically compressible, resilient and flexible polyurethane or similar type foam. The ribs 28 are composed of a highly resilient polyurethane type material as are the section joiners hereinafter discussed. Each of the components of the invention has an inherent toughness, resiliency, and memory of varying degrees which individually and collectively asure maintenance of the basic cross-sectional and longitudinal configuration as illustrated in the drawings, whether the internal tubes 30 be expanded or collapsed.

The dam 16 and heavy outer shells 20 are preferably composed of not less than ¼ inch thick solid (i.e., rather than woven fabric) rubberlike, plastic material, such as ethylene, propylene, polyurethane, or similar material based formulations having high tensile and tear strength, between 60 and 90 Shore A scale durometer hardness and specific gravity greater than 1.2. The ribs 28 are preferably composed of a polyurethane formulation having all of the characteristics above except that the durometer is between 90 Shore A scale and 40 Shore D scale. The boom section joiners 40 are preferably composed of a similar material.

The shells 20 are bonded to the dam 16. They may also be cast or molded as an integral part of the configuration. Likewise, the ribs 28 and boom section joiners 40 are bonded to the dam 16 and shells 20. The shells 20 as well as the ribs 28 and section joiners 40 may also be cast or molded as an integral part of the cross-section configuration. Additionally, the ribs 28 may be located internally as a part of the basic dam and tube configuration, rather than being positioned on the exterior.

The internal operating tubes 30 are preferably of conventional commercially available fire hose having a working pressure of greater than 100 p.s.i., light weight, flexible and collapsible with an abrasion-resistant cover and a smooth rubberlike or plastic inner surface. The flotation tube 98 may also be a length of inflated fire hose, sealed at its ends or inflated spheres or other shapes may be used.

The foam material of internal pieces 32, 33, 104, 106, 108 is preferably composed of a polyurethane formulation having compressibility of more than 4 to 1 and density of less than 4.0 pounds per cu. ft. with flexible closed cells.

FIG. 7 illustrates the principal method of connecting the extreme ends of the boom to a pier, piling, bulkhead or similar structure at which the ends of the boom terminate. A roller end plate assembly, generally designated 54, serves this function. The roller end plate 56, generally made from reinforced polyurethane, has the standard section joiner 40 on the one end. The other end incorporates six polyurethane molded or cast rollers 58, three on each side of the end plate 56. Each set of two rollers 58 is loosely fitted on a monel or stainless steel type axle 60 and held in place by monel or stainless steel type snap rings and washers. The roller end plate 56 moves within a welded, extruded, or similar fashioned channel 64 usually made of galvanized iron. The roller end plate 56 and channel 64 combination provide for vertical movement of the boom with tide and wave motion. The abrasion and bearing qualities of polyurethane and similar materials enable the roller end plate 56 to function in an unrestricted, free manner for extended periods of time in the sea environment.

In FIG. 8 is shown a side view of a complete boom installation of the present invention, illustrated in submerged condition and connected between roller end plates 56 (FIG. 7) attached to pilings 66. In order to complete the fluid flow system of such installation, a "U" connection end plate 70 (shown in cross section in FIG. 10) is provided at the outboard end of the system and an open connection end plate 80 (shown in cross section in FIG. 9) is provided at the inboard end of the system. The "U" connection end plate 70 (FIG. 10) includes a central joiner plate 72 having piano hinge-like plastic fittings on each edge thereof, similar to those at the ends of each barrier section. A U-shaped pipe 74 is mounted on central joiner plate 72, said pipe having at its ends externally threaded fittings 34 for connection to the internally threaded rotatable fittings 36 of an adjoining barrier section 11. The open connection end plate 80 also has a central joiner plate 82 (FIG. 9) having piano-hinge-like plastic fittings on each end thereof. Two L-shapped pipes are mounted on plate 82, pipe 84 extending through plate 82 and pipe 86 on one side of plate 82, for connection to an adjoining barrier section 11 by internally threaded rotatable fittings 36. The other ends of pipes 84 and 86 on the same side of plate 82 have externally threaded fittings 34 for connection to suitable hoses 88, 89 which form a part of the operating system.

The complete operating system is diagrammatically shown in FIG. 11, wherein hose 89 is selectively connected, through air valve 90 and water valve 92, to suitable sources of pressurized air and water, not shown, and hose 88 is connected through exhaust valve 94 to exhaust as desired.

Figure 4:
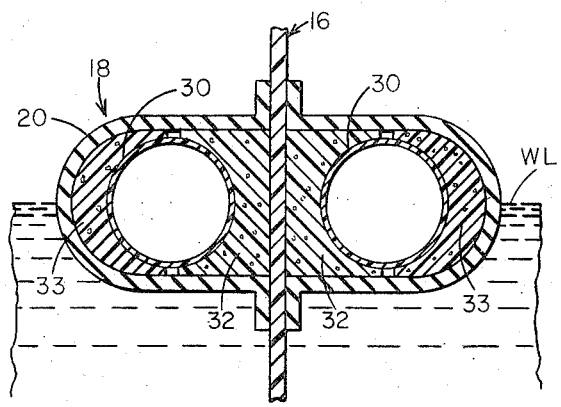
FIGS. 4-6 are enlarged sectional views of the flotation element illustrating three operating conditions thereof.

In operation, to float the boom installation of FIG. 8, the system is pressurized with air by closing water valve 92, opening air valve 90 and opening exhaust valve 94 to purge water from the tubes 30 or, alternatively, from the interior of shells 20, of the system, after which exhaust valve 94 is closed to maintain air pressure in the system, with tubes 30 expanded, or the interior of shells 20 pressurized, to compress foam pieces 32, 33 or flotation tubes 31 for the best flotation condition (FIG. 4).

Figure 5:
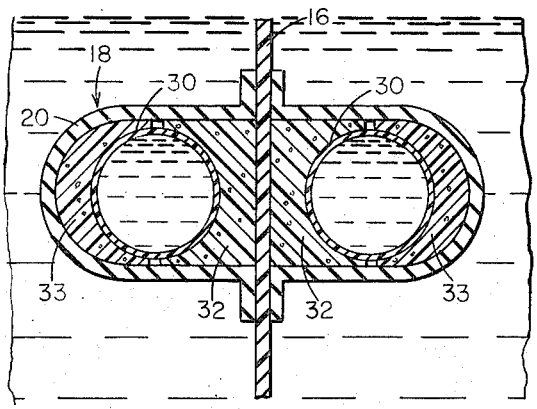

To submerge the boom to the position shown in FIG. 8, the system is pressurized with water by closing air valve 90, opening water valve 92 and opening exhaust valve 94 to purge air from the tubes 30 or the interior of shells 20 of the system, after which exhaust valve 94 is closed to maintain water pressure in the system, with tubes 30 expanded, or the interior of shells 20 pressurized to compress foam pieces 32, 33, 104, 106 or flotation tubes 98 for the submerged condition (FIG. 5).

Figure 6:
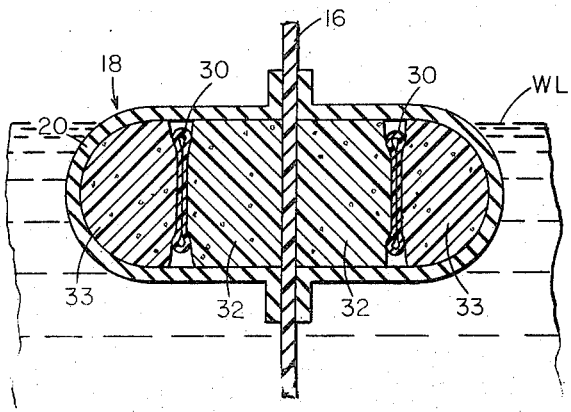

Should the air or water pressure fail for any reason and release the pressurized fluid, the tube 30 will be collapsed or space 31 reduced by the elastic expansion of foam pieces 32, 33, 104, 106 or flotation tubes 98. In the event the boom is floating on the surface, it will remain there, although at a somewhat lower waterline than is normal. If the boom section be filled with water this action will expel the water (also if the interior of shells 20 are pressurized directly). This will increase the buoyancy of the boom. However, by selecting the buoyancy and compressibility of the various components, the boom may be constructed so that it will either remain sunk, as may be desirable in certain operational conditions, or, it may be constructed so that it will rise to the surface and float there, although at a somewhat lower waterline than is normal (FIG. 6). These unique features of the invention keep unattached floating boom pieces on the surface and makes it much easier to locate and replace a damaged boom section while the boom remains in place by using a small boat, rather than by having to remove the entire installation as may be necessary with a conventional submerged boom installation.

What is claimed is:

1. a submersible barrier section comprising
a vertical dam of solid rubberlike material resiliently deformable in all directions,
selectively flotatable and sinkable elements extending laterally from opposite sides of said dam below the top thereof
each said element having
an outer shell of rubberlike material
resiliently expandable and compressible gas-filled flotation means within said outer shell to float said barrier section when expanded
said outer shell being chargeable with water under pressure to compress said gas filled flotation means to sink said barrier section.

2. A barrier section as claimed in claim 1 wherein said gas-filled flotation means is a sealed, gas-filled, deformable flotation element.

3. A barrier section as claimed in claim 1 wherein said gas-filled flotation means is a plastic closed-cell foam material.

4. A barrier section as claimed in claim 1, further including
operating means for compressing said gas-filled flotation means to sink said barrier section.

5. A barrier section as claim in claim 4, wherein said operating means includes
air connection means on said shell.

6. A barrier section as claimed in claim 4, wherein said operating means includes
a hollow collapsible operating tube within said outer shell
said hollow operating tube being selectively filled with water under pressure to collapse said gas-filled flotation means to sink said barrier section.

7. A submersible barrier section comprising
a vertical dam
selectively flotatable and sinkable elements extending laterally from opposite sides of said dam below the top thereof, said elements extending continuously along the length of said section to provide strength and continuity for said dam,
each said element having
an outer shell,
a resiliently deformable and collapsible inner hollow operating tube within said outer shell and
means for maintaining said tube in collapsed configuration and said barrier section in flotatable condition
said hollow inner operating tube being selectively filled with water or air under pressure to expand said tube, changing said elements, when filled with water, to sinkable condition to sink said barrier section and, when filled with air, to float said barrier section
said means upon release of fluid pressure in said tube operating to collapse said tube selectively to float said barrier section.

8. A barrier section as claimed in claim 7 wherein said means is compressible and resiliently elastic closed cell foam material.

9. A barrier section as claimed in claim 7 wherein said means is a compressible and resiliently elastic flotation element.

10. A barrier section as claimed in claim 7, further including
connection means for connecting each of said hollow operating tubes with those of an adjacent said section to provide a fluid tight joint therebetween.

11. A submersible barrier section comprising
a vertical dam, and
selectively flotatable and sinkable elements extending laterally from opposite sides of dam below the top thereof, and extending continuously along the length of said section to provide strength and continuity for said dam,
each said element having
an outer shell
a resiliently deformable and collapsible inner hollow operating tube within said outer shell and
resiliently compressible elastic closed cell foam material within said outer shell normally maintaining said operating tube in collapsed condition and said elements in flotatable condition
said inner hollow tube being selectively filled with water or air under pressure to compress said elastic foam material, changing said elements, when filled with water, to sinkable condition to sink said barrier section and, when filled with air, to float said barrier section
said elastic foam material upon release of pressure of fluid in said tube expanding to collapse said tube, to float said barrier section.

12. A submersible barrier section comprising
a vertical dam at least ¼ inch constructed of solid material having Shore A scale durometer hardness between 60 and 90 and resiliently deformable in all directions, and
selectively floatatable and sinkable elements extending laterally from opposite sides of said dam below the top thereof, said elements being D-shaped in cross-section providing curved outer edges and of overall width between one-fourth and two-thirds the height of said dam, said elements extending continuously along the length of said section to provide strength and continuity for said dam, each said element having an outer shell resiliently deformable in all directions, said shell being selectively chargeable with water or air to sink or float said barrier section said barrier section providing resiliently stretchable upper and lower dam edges, and at least one vertical stiffening rib of resiliently deformable plastic material, said rib extending externally of and transverse to said dam, said entire barrier section being resiliently deformable in all directions, and being free from cables, lines and chains.

13. A barrier section as claimed in claim 12, wherein each said element further has resiliently expandable and compressible gas-filled flotation means within said outer shell to float said barrier section when expanded and operating means for compressing said gas-filled flotation means to sink said barrier section.

14. A barrier section as claimed in claim 13, wherein said operating means includes a resiliently deformable inner hollow operating tube within said outer shell said hollow inner tube being selectively filled with water or air under pressure to expand said tube, changing said elements, when filled with water, to sinkable condition to sink said barrier section and, when filled with air, to float said barrier section said operating means upon release of fluid pressure in said operating tube operating to collapse said tube selectively to float said barrier section.

15. A submersible barrier section comprising a vertical dam at least ¼ inch thick constructed of solid material having Shore A scale durometer hardness between 60 and 90 and resiliently deformable in all directions, and selectively flotatable and sinkable elements extending laterally from opposite sides of said dam below the top thereof, said elements being D-shaped in cross-section providing curved outer edges and of overall width between one-fourth and two-thirds the height of said dam, said elements extending continuously along the length of said section to provide strength and continuity for said dam, each said element having an outer shell resiliently deformable in all directions, a resiliently deformable inner hollow operating tube within said outer shell and resiliently compressible elastic foam material within said outer shell maintaining said tube in collapsed condition and said barrier section in flotatable condition said inner hollow tube being selectively filled with water or air under pressure to compress said elastic foam material, changing said elements, when filled with water, to sinkable condition to sink said barrier section and, when filled with air, to float said barrier section said elastic foam material upon release of fluid pressure in said tube expanding to collapse said tube, selectively to float said barrier section said barrier section providing resiliently stretchable upper and lower dam edges, and at least one vertical stiffening rib of resiliently deformable plastic material, said rib extending externally of and transverse to said dam, said entire barrier section being resiliently deformable in all directions, and being free from cables, lines and chains.

16. A barrier section as claimed in claim 15 wherein at least one end of said section is constructed and arranged for connection to an adjacent said section, being formed with spaced projections each having a vertical opening for receiving a hinge pin, projections of adjacent sections being staggered for close-fitting interlocking to provide a hinged connection, said projections being of plastic material and having connection means for connecting each of said inner hollow operating tubes with those of an adjacent said section to provide a fluid tight joint therebetween.

* * * * *